United States Patent [19]

Leverenz

[11] Patent Number: 4,721,847
[45] Date of Patent: Jan. 26, 1988

[54] MULTIPLE ZONED RUNNER DISTRIBUTOR HEATER

[75] Inventor: David Leverenz, Elk Grove Village, Ill.

[73] Assignee: Fast Heat Element Mfg. Co., Inc., Elmhurst, Ill.

[21] Appl. No.: 817,020

[22] Filed: Jan. 8, 1986

[51] Int. Cl.$^4$ .............................................. H05B 3/48
[52] U.S. Cl. .................................... 219/421; 219/422; 219/539; 219/544; 425/DIG. 13; 425/548; 425/379 R
[58] Field of Search ............... 219/421, 422, 426, 423, 219/420, 539, 544, 548, 553; 29/611, 613; 425/547, 549, 548, 550, 551, 378 R, 378 S, 379 S, DIG. 13, 564, 566, 568; 222/146.2, 146.5

[56] References Cited

U.S. PATENT DOCUMENTS

| | | | |
|---|---|---|---|
| 2,777,931 | 1/1957 | Bundegaard | 219/494 |
| 2,834,992 | 5/1958 | Jupa | 425/548 |
| 3,307,135 | 2/1967 | Simmons | 219/544 |
| 3,439,150 | 4/1969 | Wells | 219/544 |
| 3,678,249 | 7/1972 | Lennox | 219/544 |
| 3,970,822 | 7/1976 | Wrob | 219/544 |
| 4,039,995 | 8/1977 | Walton | 29/611 |
| 4,039,996 | 8/1977 | Handerhan | 219/546 |

Primary Examiner—E. A. Goldberg
Assistant Examiner—Teresa J. Walberg
Attorney, Agent, or Firm—Leydig, Voit & Mayer

[57] ABSTRACT

A electric runner distributor heater for use in passageway of a mold into which a flow stream of fluid plastic material is introduced and which in turn communicates with a plurality of sprue orifices. The heater includes a metal casing having an exposed surface over which the fluid material is directed at an elevated temperature, a plurality of unsheathed electrical heating elements disposed in respective zones of the casing corresponding to the location of selected of the sprue orifices, heat transmitting material compacted in the bore of the casing and surrounding each heating element for electrically insulating the heating element from the casing and filling all air voids between the casing and heating element to effect direct heat transfer to the casing from the heating element, leads coupling the heating elements to a power source, and a control for independently controlling the temperature of the heating elements and thus the temperature of respective zones of the casing.

11 Claims, 5 Drawing Figures

MULTIPLE ZONED RUNNER DISTRIBUTOR HEATER

DESCRIPTION OF THE INVENTION

The present invention relates generally to electric heaters for plastic injection molding equipment, and more particular, to runner distributor type heaters that are mountable within a flow passageway of the equipment to maintain the temperature of the material flowing therethrough to a desired temperature.

A runner distributor heater of such type is commonly used in an elongated runner passageway in the mold frame, which in turn feeds a plurality of sprue orifices through which the material flows as it is being directed to respective part cavities of the mold assembly. While from a production efficiency standpoint it is desirable to supply a relatively large number of sprue orifices from the single runner passageway, in practice it has been found difficult to control the temperature of the molten plastic material passing through long runner passageways and production difficulties occur. If the temperature in a portion of the runner passageway communicating with one or more sprue orifices is less than required for maintaining proper flow conditions, increasing the temperature of the runner distributor heater to compensate for the temperature deficiency in that portion of the passageway often increases the temperature in other regions of the runner passageway to a point that a balanced flow through the runner passageway still cannot be maintained. Similar difficulties are incurred when it is desired to lower the temperature of the material flowing into only some of the sprue orifices from a single runner passageway.

It is an object of the present invention to provide a runner distributor heater that is adapted for more uniform temperature control of molten plastic materials flowing through even relatively long runner passageways in mold equipment, and hence, which permits better temperature control of the material flowing from such runner passageway into a plurality of sprue orifices.

Another object is to provide a runner distributor heater as characterized above which is adapted to permit selective temperature control in different zones or regions of an elongated mold passageway.

A further object is to provide an electric heater of the above kind for plastic injection molding equipment and the like which lends itself to economical manufacture and easy control.

Other objects and advantages of the invention will become apparent upon reading the following detailed description and upon reference to the drawings, in which.

Figure 1:
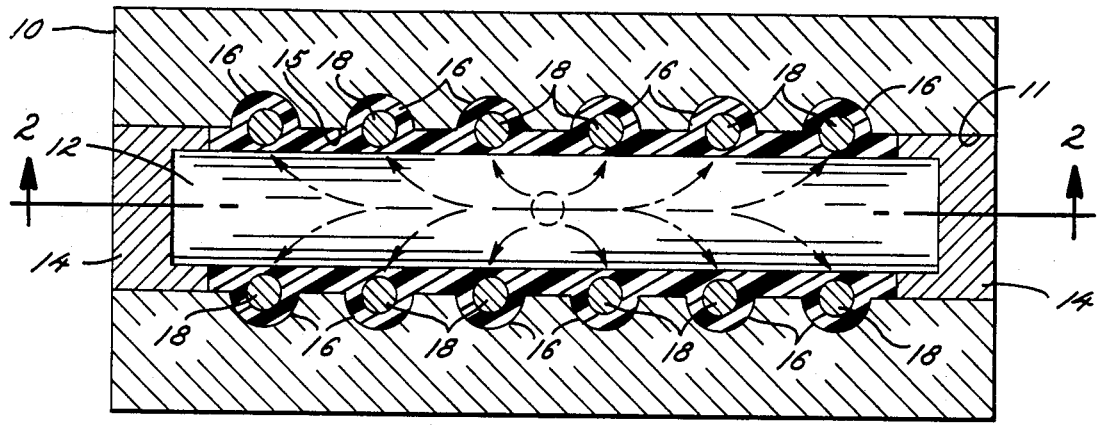
FIG. 1 is a fragmentary section of a mold frame of a plastic injection molding machine having a runner distributor heater embodying the present invention mounted in a elongated runner passageway therein, which in turn feeds a plurality of sprue orifices.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIG. 1 of the drawings, there is shown a frame or mold base 10 of a typical plastic injection molding machine that is formed with a central elongated bore or runner passageway 11 within which is mounted a runner distributor heater 12 embodying the present invention. The heater 12 is concentrically mounted within the bore 11 at its opposed ends by a pair of support brackets 14 of a known type so as to define a runner passageway 15 about the perimeter of the heater 12. As is known in the art, molten plastic may be directed into an inlet passageway of frame or mold base 10 from a plastic injection nozzle, and in this case enters the runner passageway 15 at a central location and is divided into flow paths in opposite directions, as diagrammatically illustrated in FIG. 1. The material flows from the runner passageway 15 into a plurality of sprue passageway or passageways 16 running transversely to the runner passageway 15, and each sprue orifice is heated by a respective torpedo heater 18 in a conventional manner. Material from each sprue orifice ultimately is directed to a respective part cavity in the mold body, as is known in the art. In accordance with the invention, the runner distributor heater is adapted for selectively controlled heating of plastic in predetermined regions or zones of the runner passageway for enhancing the uniform and balanced flow of plastic to the plurality of sprue orifices. To this end, the illustrated heater 12 comprises a cylindrical metal casing 20 having an axial bore 21 extending substantially the length of the casing, terminating short of one end thereof. The other or open end of the casing is formed with an enlarged diameter counter bore section 22.

In keeping with the invention, disposed within the casing bore 21 are a plurality of selectively controllable heating elements 24a, 24b, in this case two in number, adapted for selectively maintaining the temperature of molten plastic material within determined zones of the runner passageway 15. Each of the heating elements 24a, 24b in this case comprises a resistance wire 25a, 25b which is wound tightly upon a respective ceramic core 26a, 26b of a diameter less than the diameter of the bore 21 of the casing. Each core 26a, 26b is interposed between a relatively thin frangible ceramic spacer. In this instance, the core 26a is interposed between an outermost spacer 28 and an intermediate spacer 29, and the core 26b is interposed between the intermediate spacer 29 and a spacer 30 adjacent the other end of the casing.

Figure 5:
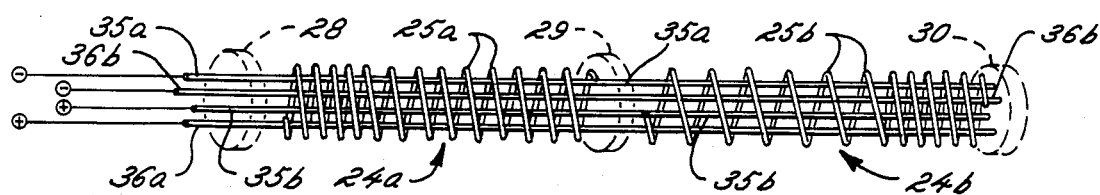
FIG. 5 is a diagrammatic illustration of the electrical winding and lead pin arrangement of the illustrated runner distributor heater.

In carrying out the invention, the electrical resistance wires 25a, 25b for the respective heating elements 24a, 24b are independently connected to an electrical source to facilitate select energization of the respective heating element. For this purpose, the core 26a, 26b of each element 24a, 24b is provided with a respective pair of lead pins or wires 35a, 36a and 35b, 36b which extend through the cases and to which the respective resistance wire 25a, 25b of the element is electrically coupled. In the illustrated embodiment the lead pins 35b, 36b for the heating element 24b have their innermost ends disposed in apertures in the spacer 30 adjacent the right end of the casing bore 21, as best viewed in FIGS. 2 and 5, and extend through the core 26b, the center spacer 29, core 26a, and into the spacer 28. One end of the resistance wire 25b for the heating element 24b is connected to the lead pin 35b adjacent one end of the core 26b and the other end of the wound resistance wire 25b is connected to the lead pin 36b adjacent the opposite end of the core 26b, as illustrated in FIG. 5. The pair of lead pins 35a, 36a for the heating element 24a similarly extend through respective apertures in the spacers 28, 29 and core 26a. One end of the resistance wire 25a is connected to the lead pin 35a at a point adjacent one end of the core 26a and the opposite end of the wound resistance wire 25a is connected to the lead pin 36a at the opposite end of the core 26a. To facilitate manufacture, the cores 26a, 26b each are formed with four apertures, and the lead pins 35a, 36a and 35b, 36b all of similar length for extending through both cores 26a, 26b even through the lead pins 35a, 36a are not be coupled to a resistance wire in the core 26b. Alternatively, the core 26b need only be formed with two apertures for the lead pins 35b, 36b, and the lead pins 35a, 36a can be made of shorter length so to extend only through the core 26a.

Figure 2:
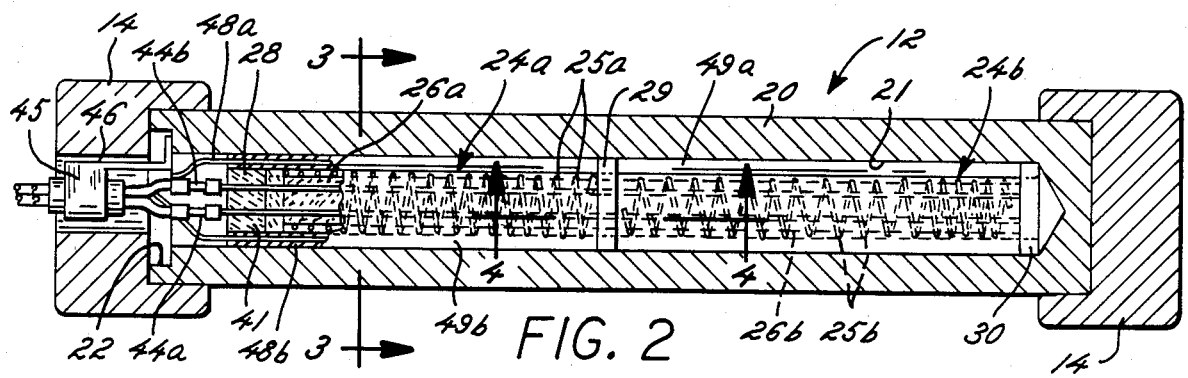
FIG. 2 is an enlarged vertical section of the illustrated runner distributor heater taken in the plane of line 2—2 in FIG. 1.
Figure 3:
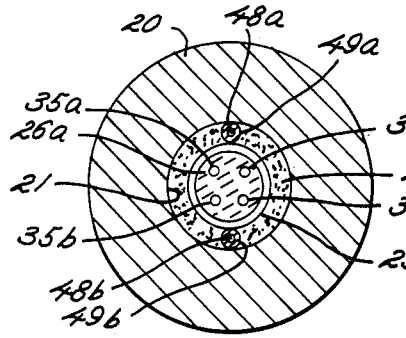
FIG. 3 is an enlarged transverse section of the runner distributor heater taken in the plane of line 3—3 in FIG. 2.
Figure 4:
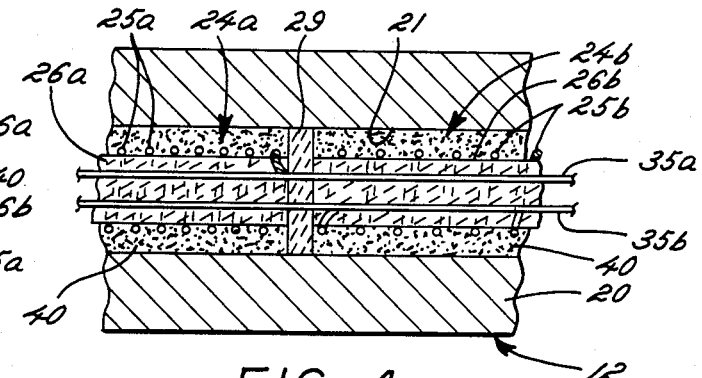
FIG. 4 is an enlarged fragmentary longitudinal section of the runner distributor heater taken in the plane of line 4—4 in FIG. 2.

To compensate for irregular heat drains or losses along the heater, and thus provide a more uniform heat profile for heated fluid plastic material passing over the heater, the electrical windings 25a, 25b may be shaded or concentrated at selected locations. In the illustrated embodiment, the windings 25a, 25b are shaded, as illustrated in FIGS. 2 and 5, at locations adjacent the opposed ends of the heater to insure adequate and uniform heating at such locations.

During manufacture of the heater 12, heat transmitting material 40, such as magnesium oxide powder or similar material, is deposited in the space between the cores 26a, 26b and the casing bore 21, whereupon a mica or lava washer 41, also formed with holes to permit passage of the lead pins 35a, 36a, 35b, 36b is fitted into the open end of the bore 21 firmly against the spacer 28. The assembly preferably is vibrated to pack the magnesium oxide powder tightly within the casing to fill all air voids within the assembly. Means, such as an adhesive, may be provided for temporarily retaining the lava washer in position so as to tightly lock the heating elements and the magnesium oxide powder within the casing.

The assembly of the metal casing 20 and heating elements 24a, 24b is then swaged so as to reduce the diameter of the casing bore 21 and compress the packed magnesium oxide powder within the bore. This provides an effective heat transfer contact between the heating elements 24a, 24b and the casing 20 for enhancing efficient and uniform heat transfer to the casing. Following swaging, the adhesive or other means utilized for temporarily retaining the lava washer 41 within the casing may be removed, with the lava washer being fixedly retained in mounted position by the resulting tight friction fit.

For coupling the pairs of lead pins 35a, 36a and 35b, 36b for the respective elements 24a, 24b to an electrical source, appropriate pairs of lead wires 44a and 44b are connected thereto. For supporting the pairs of lead wires in outstanding relation to the end of the casing 20 so as to prevent the transfer of stresses to the lead pins connected thereto, the pairs of lead wires 44a, 44b are supported by a clip support 45 having a cantilever arm 46 welded within the counterboard recess 22 of the casing 20. To control the temperature in the respective zone of each heating element 24a, 24b, a respective pair of thermal couple probes 48a, 48b are provided. In the illustrated embodiment, a hypo tube 49a, 49b is disposed adjacent the perimeter of the bore 21 of the casing 20 and embedded in the magnesium oxide powder, and the respective thermal couple probes 48a, 48b for each heating element is housed within the hypo tubes 49a, 49b and extends to a respective point, preferably centrally disposed within the zone to be heated by the respective heating element, for sensing the temperature at such point. It will be understood by one skilled in the art that power to the respective heating element may thereby be selectively controlled in a known manner.

In operation of the mold equipment, molten plastic is directed into the mold base from a nozzle of the injection molding machine and flows centrally into the runner passage 15, as diagrammatically illustrated in FIG. 1. The runner distributor heater 12 may be controlled so as to maintain the desired temperature in the zone associated with the heating element 24a and may be also selectively controlled to maintain a desired temperature in the zone of the heating element 24b. The flow of the plastic in the respective zones thereby may be independently controlled for maintaining a balanced flow of material into the plurality of sprue orifices 15 for optimum and efficient operation of the mold equipment. In the event adjustment in temperature in one zone is necessary, it may be accomplished without effecting the temperature or flow in the other zone. While the illustrated runner distributor heater 12 has been shown with two heating elements of equal length, it will be understood that the heating elements may be of different lengths, and alternatively, the heater may have more than two zones by utilizing greater numbers of axially aligned and independently controlled heating elements. Moreover, while the resistance wires of the illustrated heating elements have been shown as being connected electrically in parallel, it will be understood that alternatively they could be connected in series.

From the foregoing, it can be seen that the runner distributor heater of the present invention is adapted for more uniform temperature control of molten plastic materials flowing through even relatively long runner passageways in mold equipment, and hence, permits better temperature control of the material flowing from such runner passageway into a plurality of sprue orifices. The heater also is of relatively simple construction and lends itself to economical manufacture and easy control.

I claim as my invention:

1. An electric heater comprising a metal casing having an exposed surface over which a fluid material may be directed at an elevated temperature, said casing being formed with an internal bore, a plurality of unsheathed electrical heating element disposed in respective zones of said casing bore, said heating elements each including an elongated insulating core and an associated resistance wire assembled thereon, heat transmitting material compacted in the bore and surrounding each heating element for electrically insulating the heating element from the casing and filling all air voids between said casing and heating element to effect direct heat transfer to the casing from the heating element, a plurality of lead pins extending through the core of each heating element with the resistance wire of each heating element being coupled between a respective separate pair of said lead pins such that the resistance wire of each heating element is in an electrical circuit that is isolated from the electrical circuit of the residence wire of each other heating element, means connecting said respective separate pairs of lead pins to a power source for conducting current through the resistance wire connected between each said respective pair of lead pins for heating the respective heating element, and controlling means for controlling the temperature of each said heating element independently of the temperature of each other heating element and thus the temperature of separate zones on the exposed surface of said casing corresponding to the location of the individual heating elements.

2. The electric heater of claim 1 wherein said controlling means includes a thermocouple associated with each heating element, and said thermocouple for each heating element extends into the casing bore to a predetermined temperature sensing point.

3. The electric heater of claim 1 including lead means coupled to said lead pins and extending out an end of said casing.

4. The electric heater of claim 3 in which said casing has a rounded end at the end opposite from which the lead means extends.

5. The electric heater of claim 1 in which said lead pins all extend substantially the length of said bore.

6. The electric heater of claim 1 in which the resistance wire of each respective heating element is connected to said respective pair of lead pins at points located at opposed ends of the core of the heating element.

7. The electric heater of claim 6 in which said heating element cores are disposed in longitudinally spaced relation to each other in said casing bore.

8. The electric heater of claim 7 in which said cores are separated by an insulating spacer.

9. In a plastic injection molding apparatus having a mold formed with an elongated runner passageway into which a flow stream of fluid plastic material is introduced and which in turn communicates with a plurality of sprue orifices at axially spaced locations along the runner passageway, a runner distributor heater comprising a metal casing having an exposed surface over which fluid plastic material may be directed at an elevated temperature, said casing being formed with an internal bore, a plurality of unsheathed electrical heating elements disposed in respective zones of the casing each corresponding to the location of selected of the sprue orifices, said heating elements each including an elongated insulating core and an associated resistance wire assembled thereon, heat transmitting material compacted in the bore and surrounding each heating element for electrically insulating the heating element from the casing and filling all air voids between said casing and heating element to effect direct heat transfer to the casing from the heating element, a plurality of lead pins extending through the core of each heating element with the resistance wire of each heating element being coupled between a respective separate pair of said lead pins such that the residence wire of each heating element is in an electrical circuit that is isolated from the electrical circuit of the residence wire of each other heating element, means connecting said respective separate pairs of lead pins to a power source for conducting current through the resistance wire connected between each said respective pair of lead pins for heating the respective heating element, and means for independently controlling the temperature of said heating elements and thus the temperature of separator zones on the exposed surface of said casing corresponding to the location of the individual heating elements.

10. In the plastic injection molding apparatus of claim 9 wherein said controlling means includes a thermocouple associated with each heating element, said thermocouple for each heating element extending into the casing bore to a predetermined temperature sensing point.

11. In the plastic injection molding apparatus of claim 9 in which said heating element cores are disposed in longitudinally spaced relation to each other in said casing bore.

* * * * *